United States Patent [19]
Curti

[11] Patent Number: 4,523,438
[45] Date of Patent: Jun. 18, 1985

[54] APPARATUS FOR RECOVERY OF HEAT FROM FUMES IN A HEATING SYSTEM OR FROM THE AMBIENT AIR

[76] Inventor: Paolo Curti, Via Belsoggiorno 7, 6500 Bellinzona, Switzerland

[21] Appl. No.: 511,196

[22] Filed: Jul. 6, 1983

[30] Foreign Application Priority Data

Jul. 21, 1982 [CH] Switzerland ............ 4436/82

[51] Int. Cl.³ .................................. F25B 27/02
[52] U.S. Cl. ............................ 62/238.6; 237/2 B
[58] Field of Search ............ 237/2 B; 62/238.6, 324.1; 165/DIG. 12, DIG. 2, DIG. 18

[56] References Cited

U.S. PATENT DOCUMENTS 4,287,723 9/1981 Dosmond ...................... 237/2 B

FOREIGN PATENT DOCUMENTS 2806029 8/1979 Fed. Rep. of Germany ... 165/DIG. 12

*Primary Examiner*—Henry Bennett
*Attorney, Agent, or Firm*—Young & Thompson

[57] ABSTRACT

The apparatus includes a condenser (4), through which passes a duct (3") that carries, downward, the fumes from heating boiler (1) to bring them into a lower chamber (5). The fumes are mixed with ambient air in this chamber (5), a mixture that is then moved upward, going through the evaporator (4) by the action of a fan (9), placed contiguous to the collection chamber (10), placed above the evaporator (4). Together with the recovery of heat from the fumes there is a recovery of the heat contained in the ambient air. Besides the high efficiency that can be obtained with a limited capital investment, in the case of fumes the apparatus purifies them of the solid particles in suspension and even noxious gaseous components. The apparatus is used independently of the hot gas, for example, to heat water for domestic use. The air that is exhausted by the fan (9) after having given up its heat inside the evaporator (4) can be used for conditioning a closed area.

2 Claims, 1 Drawing Figure

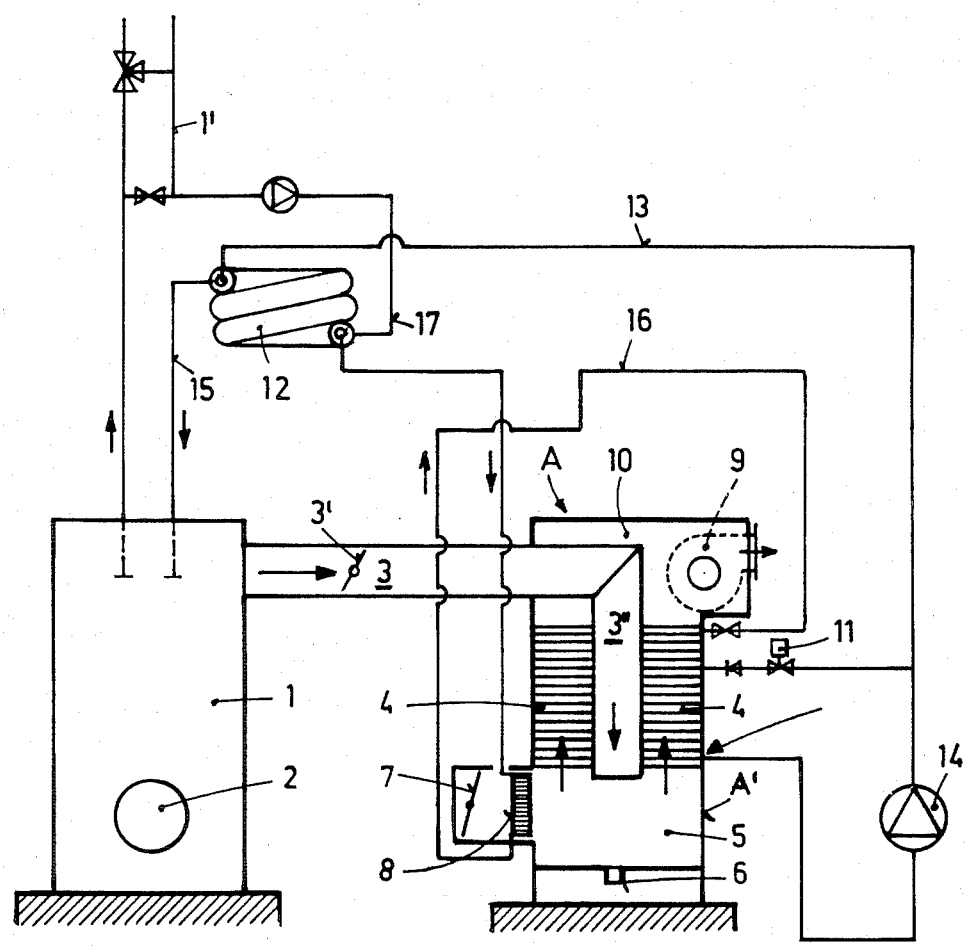

APPARATUS FOR RECOVERY OF HEAT FROM FUMES IN A HEATING SYSTEM OR FROM THE AMBIENT AIR

This invention relates to an apparatus based on the known principle of the heat pump for recovery of heat from the hot fumes in a heating system and for their simultaneous purification, or simply for recovery of heat from the natural ambient air and for air conditioning a dwelling, for example.

Apparatus for recovery of heat from the fumes dispersed in a flue in a boiler heating system, based on the use of a heat pump, are known. They are seen, for example, in Offenlegungsschrift No. DE 2758181 of July 5, 1979 and European patent application No. 0013018 of Dec. 22, 1978.

The apparatus according to this invention differs notably from known embodiments by the presence of devices that make possible the recovery of heat not only from the fumes of a heating system but also from ambient air, with the possibility of simultaneously conditioning the air in a dwelling. Further, in the case of fumes, it purifies the fumes of the solid particles in suspension and even of noxious gaseous components, such as sulfur dioxide and others, with resulting undeniable advantages from the ecological viewpoint.

If this apparatus is applied to a flue in a domestic heating system, during the summer period, when the burner is cut off, this apparatus makes it possible, by removing the heat from the natural ambient air, to supply the heat necessary for heating water for domestic use and, by using the exhaust air, to condition the air in one or more apartments.

This apparatus is characterized by comprising devices that make possible the recovery of heat from fumes with purification of the fumes in a heating system and simultaneously and independently recovery of heat from the natural ambient air.

For greater clarity, the accompanying drawing represents a preferred embodiment of this apparatus.

Specifically, the single FIGURE diagrammatically shows a boiler heating system with this apparatus incorporated.

With reference to the FIGURE, boiler 1 is equipped with a burner 2. From boiler 1, the hot fumes are carried through duct 3, provided with valve 3', which can be operated by the hand in the unit of apparatus A which is made like a closed box. After a 90° downward bend 3" of closed duct 3, the fumes are directed vertically upward, going through evaporator 4, which is a part of the heat pump system. The hot fumes, carried by at least a closed duct 3", undergoing a preheating in their travel downward into chamber 5 under evaporator 4, come into a chamber that is intended for mixing of the fumes with the ambient air. An outlet 6 for the condensate that precipitates from evaporator 4 is attached to the base of mixing chamber 5.

Intake of natural ambient air into mixing chamber 5 is permitted by a butterfly valve 7, which is upstream from an additional condenser 8, said valve regulates the flow of air aspirated through said condenser as a function of the temperature in the mixing chamber 5.

Said butterfly valve 7 is controlled by a probe, not shown in the drawing, which probe is placed on the inside of mixing chamber 5. In this way the efficiency of the heat pump, which comprises said evaporator unit 4 and main condenser 12, better described below, is kept at a maximum, further ensuring an effective purification of the fumes at any temperature of the ambient air.

After the fumes from the boiler have been mixed with ambient air, the mixture or only the natural ambient air on leaving the mixing chamber 5 goes up through evaporator unit 4. Mixing chamber 5 has a parallelipiped shape to cause a considerable turbulence in it and therefore a complete mixing of the fumes and air.

Said rising passage is helped by a fan 9 mounted contiguous to collection chamber 10, which is above mixing chamber 5 and evaporator 4. Fan 9, moreover, advantageously performs the only drawing of the fumes that are generated in the boiler.

Evaporator 4 consists of a large number of coils. More precisely, the tubular, straight sections of the coils, which are swept by the mixture of fumes and rising air, are placed horizontally while their head connections are inclined. A fluid, advantageously consisting of dichlorodifluoromethane, marketed as Freon 22, circulates in the bank of coils, preferably made of copper pipe.

Butterfly valve 7, which is placed upstream from the additional condenser 8 and mixing chamber 5 and varies the amount of natural ambient air, makes it possible to maintain a constant temperature in chamber 5.

Fan 9 for removing the mixture of purified gas and/or cooled air is of the constant capacity type.

Apparatus A can be considered self-sufficient in removing heat only from the ambient air to produce hot water for domestic use and for required heating up to a certain outside temperature.

The boiler, equipped with a burner, therefore constitutes a supplement limited to cold periods.

There will be a continuous production of hot water in the summer while the burner is cut off.

On the other hand, in the cold period, namely the winter or when the condenser is producing hot water, the burner will go on to meet heating requirements.

As already said, when burner 2 is off, the air that is exhausted from apparatus A by fan 9, after a certain amount of heat has been extracted from it, can advantageously be used for air conditioning a closed area.

Advantageously, evaporator 4 is equipped with a system for automatic defrosting by reversal of the cycle provided with expansion valve 11. This system in turn is controlled by a pressure switch which gives the defrost order only when the evaporator is covered with ice.

Besides controlling the defrosting operation, the pressure switch, not shown in the drawing, which is placed in the Freon gas piping going into the compressor, momentarily cuts off burner 2 to prevent fan 8 from exhausting fumes that have not been cooled and purified.

The operation of defrostiing evaporator 4 lasts about one to two minutes.

Said additional condenser 8 makes further cooling of the Freon or other suitable liquid possible to enable main condenser 12 to stay at a rather high temperature, namely, 70°-80°.

The apparatus assures purification of the fumes even at high condensation temperatures.

With reference to the FIGURE it is to be noted that in a central heating system, main condenser 12 is placed on the boiler hot water return with countercurrent operation. Main condenser 12 has at its upper end the hot (Freon) gas intake connection. Compressor 14 discharges into duct 13. Hot water outlet connection 15 is at the upper end of condenser 12, and liquid Freon connection 16 and cold water heating intake connection 17 are at the lower end thereof.

With a mixture of fumes and ambient air fed to mixing chamber 5, in apparatus A, and by the action of evaporator 4, numerous noxious gaseous components, such as sulfur dioxide and others, are eliminated from the fumes by precipitation, along with a considerable amount of water, contained in the air, further dehumidifying what is exhausted by the fan.

Besides the notable energy savings in the heating system, the apparatus makes possible the almost total elimination of noxious gaseous and solid components from the fumes with indisputable advantages from the ecological viewpoint.

I claim:

1. Apparatus for the recovery of heat from fumes in a heating system or from the ambient air, comprising a boiler with a burner for heating water, a flue for carrying fumes from the burner to a casing, the casing having a mixing chamber at its bottom and a collection chamber at its top and an evaporator between said mixing and collection chambers, a suction fan for removing gas from said collection chamber, said flue discharging said fumes into said mixing chamber, means to admit ambient air into said mixing chamber, a closed expansion-compression refrigeration cycle in heat exchange with said water and including said evaporator, the refrigerant in said closed refrigeration cycle passing downwardly through said evaporator in countercurrent with said fumes rising from said mixing chamber through said evaporator, and a heat exchanger through which said refrigerant passes to warm said ambient air as said ambient air enters said mixing chamber.

2. Apparatus as claimed in claim 1, said heat exchanger being disposed immediately upstream of said evaporator with respect to the flow of said refrigerant.

* * * * *